(12) United States Patent
Chen et al.

(10) Patent No.: US 7,072,178 B2
(45) Date of Patent: Jul. 4, 2006

(54) MOUNTING ASSEMBLY FOR DATA STORAGE DEVICE

(75) Inventors: Yun-lung Chen, Tu-Cheng (TW); Hai-Lie Ye, Shenzhen (CN); Zhou Xu, Shen-Zhen (CN)

(73) Assignee: HON HAI Precision Industry Co., LTD, Tu-cheng (TW)

( * ) Notice: Subject to any disclaimer, the term of this patent is extended or adjusted under 35 U.S.C. 154(b) by 137 days.

(21) Appl. No.: 10/950,746

(22) Filed: Sep. 27, 2004

(65) Prior Publication Data

US 2005/0052841 A1 Mar. 10, 2005

(30) Foreign Application Priority Data

Oct. 9, 2003 (TW) ............................. 92218117 U

(51) Int. Cl.
*G06F 1/16* (2006.01)

(52) U.S. Cl. ...................... 361/685; 361/684

(58) Field of Classification Search ............... 361/684, 361/685

See application file for complete search history.

(56) References Cited

U.S. PATENT DOCUMENTS 5,349,483 A 9/1994 Tsai ....................... 360/97.01

FOREIGN PATENT DOCUMENTS

| CN | 00231885.7 | 5/2001 |
| TW | 285393 | 4/1992 |
| TW | 190919 | 9/1992 |

*Primary Examiner*—Yean-Hsi Chang
(74) *Attorney, Agent, or Firm*—Morris, Manning & Martin; Tim Tingkang Xia, Esq.

(57) ABSTRACT

A data storage device mounting assembly for mounting a data storage device (400) with screws (401) includes a bracket (100), and an operating member (200). The bracket includes a first sidewall (130) and a second sidewall (150) each defining a groove (131) therein. The first sidewall includes a protrusion (137) near the groove. The operating member comprises a locking portion (220) with a cutout (222) and a fixing hole (224). The operating member is rotatably attached to the first sidewall of the bracket. The data storage device is slidably moved into the bracket with screws sliding in the grooves. The data storage device is secured in the bracket with the screw held in the cutout and the protrusion received in the fixing hole of the operating member.

19 Claims, 5 Drawing Sheets

MOUNTING ASSEMBLY FOR DATA STORAGE DEVICE

BACKGROUND OF THE INVENTION

1. Field of the Invention

The present invention relates to a mounting assembly for a data storage device, and more particularly to a data storage device mounting assembly with a simplified configuration for convenient use.

2. Description of Related Art

A typical data storage device mounting assembly is usually directly mounted to a computer case with a plurality of screws. However, a screwdriver or other tools are necessary for installation or removal of the screws, which causes inconvenience and time-comsuming issues in the assembly or disassembly process of the data storage device.

A typical data storage device mounting assembly is disclosed in U.S. Pat. No. 5,349,483. The hard disk mounting assembly comprises a container, a hard disk drive (HDD) and a cover. A top face of the container defines a rectangular entrance and four screw holes are defined at four corner portions of the rectangular container. The HDD defines a plurality of screw apertures at a top face thereof. The cover defines a plurality of fixing openings corresponding to the screw apertures of the HDD and the screw holes of the container. A plurality of bolts penetrates through the fixing openings of the cover and received in corresponding screw apertures of the HDD, thereby connecting the cover with the HDD. The HDD is received in the container and fixed to the container by screws penetrating through the fixing openings of the cover and received in the corresponding screw holes of the container. However, the conventional hard disk mounting assembly disclosed above must utilize a screwdriver or other tools for installation or removal of the screws, which causes time-comsuming issue in the hard-disk assembly or disassembly process. In addition, mounting or detaching the HDD with a screwdriver or other additional tools in a limited space of a computer case is unduly inconvenient.

Another typical data storage device mounting assembly is disclosed in Taiwan Patent No. 371062. The hard disk mounting assembly comprises a chassis and a fixing bracket. The HDD is contained in the bracket. The chassis forms a pair of first slideways and defines a pair of screw apertures. A top face of the fixing bracket forms a pair of second slideways paralleling with each other and respectively corresponding to the first slideways of the chassis, and a pair of fixing pieces perpendicularly extending from the top face of the bracket. Each fixing piece defines a fixing hole. In assembly, the HDD is received in the bracket. The second slideways of the bracket slide along the first slideways of the chassis. A pair of bolts respectively penetrates through the corresponding fixing holes of the bracket and received in the screw apertures of the chassis, thereby mounting the HDD to the chassis. However, the bracket of the conventional data storage device mounting assembly is attached to the bracket by screws. A screwdriver or other tools for installation or removal of the screws is necessary, which is unduly inconvenient and laborious. Furthermore, the directly attaching means of the conventional data storage device mounting assembly can hardly absorb vibration of the bracket or the chassis.

SUMMARY OF THE INVENTION

Accordingly, an object of the present invention is to provide a data storage device mounting assembly with a simplified configuration, and which is convenient to use.

To achieve the above object, a mounting device for data storage device comprises a bracket, and an operating member. The bracket comprises a first sidewall and a second sidewall each defining a groove therein. The first wall comprises a protrusion near the groove. The operating member pivotally attached to the first sidewall comprises a locking portion, and a connecting portion. The locking portion defines a cutout, and a fixing hole therein. A plurality of screws is mounted on sidewalls of the data storage device and slides along the grooves of the bracket. When the data storage device reaches its predetermined position in the bracket, the operating member is pushed to rotate so that the cutout engages one screw of the data storage device and the fixing hole receives the protrusion, thereby the data storage device is fixedly mounted in the bracket.

Other objects, advantages and novel features of the present invention will be drawn from the following detailed description of preferred embodiment of the present invention with the attached drawings, in which:

DETAILED DESCRIPTION OF THE INVENTION

Figure 1:
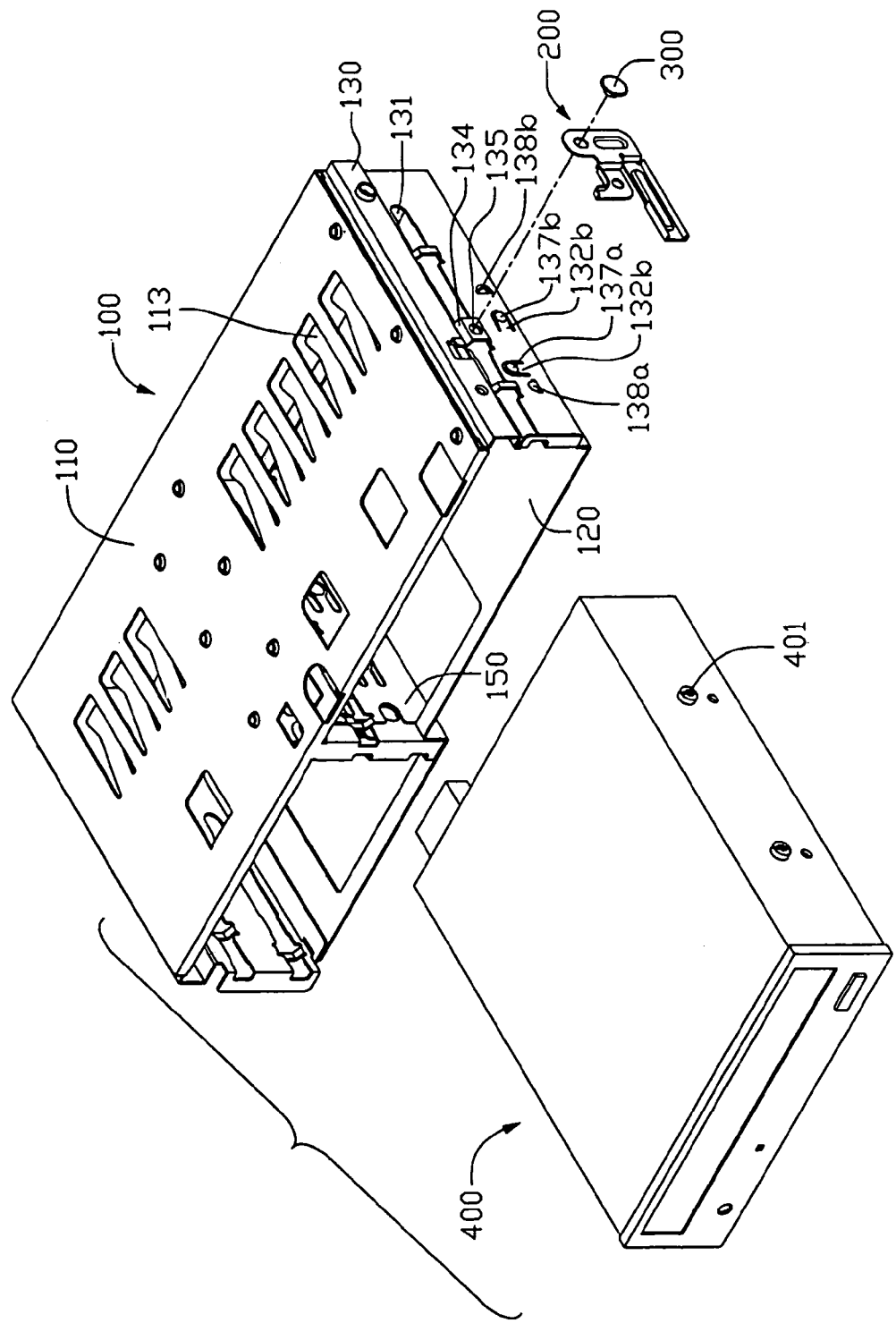
FIG. 1 is an exploded, isometric view of a data storage device mounting assembly in accordance with a preferred embodiment of the present invention comprising a data storage device, a bracket, and an operating member.

Referring to FIG. 1, a data storage device mounting assembly in accordance with the preferred embodiment of the present invention comprises a bracket 100, an operating member 200 pivotally attached to the bracket 100, a data storage device 400 slidably mounted in the bracket 100. A plurality of protrusions, such as thumb screws 401, is mounted to sidewalls of the data storage device 400.

The bracket 100 comprises a bottom wall 120, a first sidewall 130 and a second sidewall 150, and a top wall 110. The first and second sidewalls 130, 150 perpendicularly extend from opposite edges of the bottom wall 120. The top wall 110 parallels to the bottom wall 120. The top wall 110, the first and second sidewalls 130 and 150, and the bottom wall 120 cooperatively define a space for receiving the data storage device 400 therein.

Figure 4:
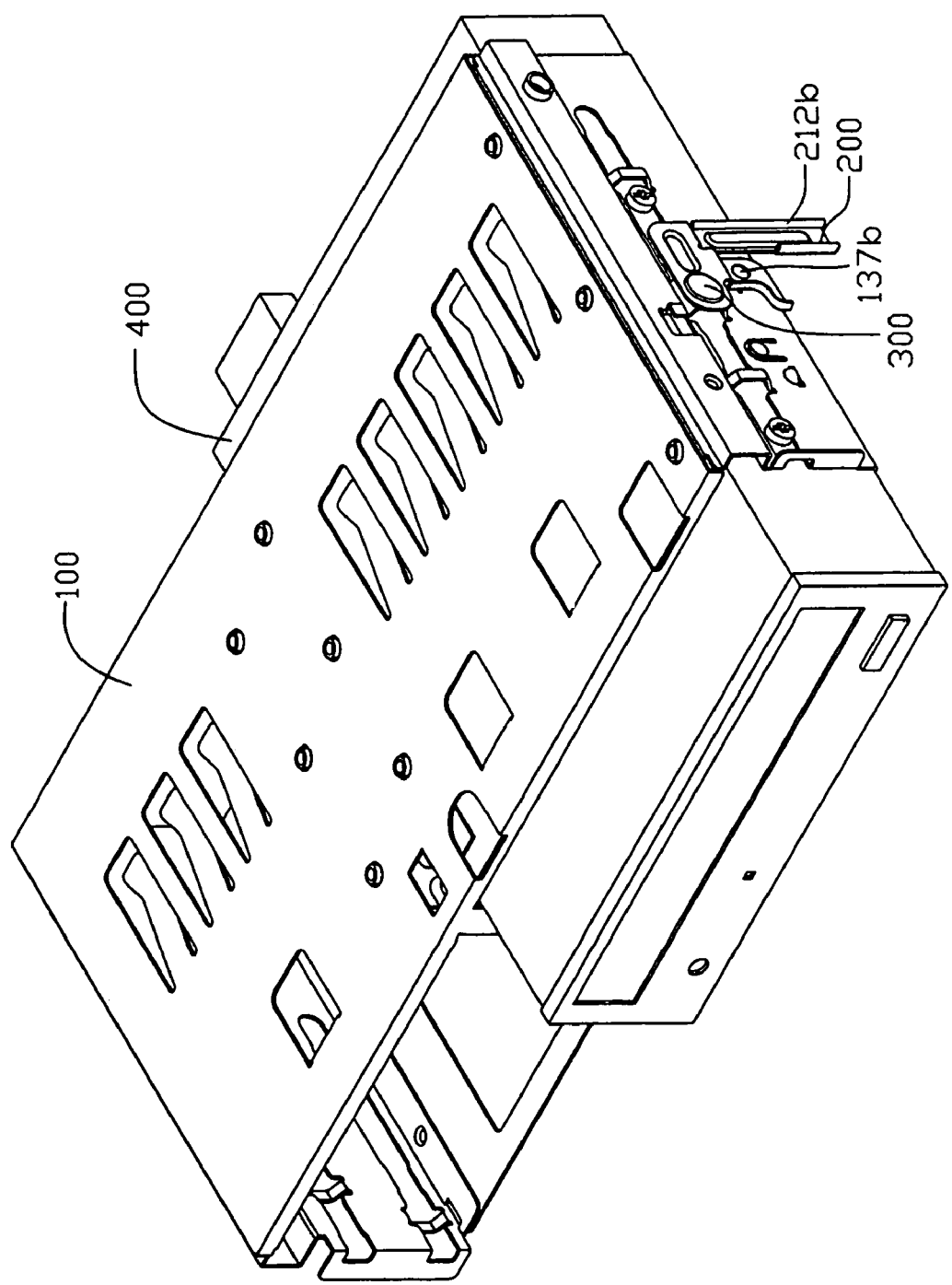
FIG. 4 is similar to FIG. 3, but showing the data storage device in an unlocked state.

A plurality of resilient strips 113 extends downwardly from the top wall 110, which apply a down force on the data storage device 400 for preventing vibration. A pair of grooves 131 is longwise defined in the first and second sidewalls 130 and 150, for slidably receiving the screws 401 of the data storage device 400. A protruding member 134 extends outwardly from the first sidewall 130 and essentially across the groove 131. A first though hole 135 is defined in the protruding member 134. Referring also to FIG. 4, a first resilient tab 132a extends outwardly from the first sidewall 130, perpendicular to the groove 131. A second resilient tab 132b extends outwardly from the first sidewall 130, parallel to groove 131. A first protrusion 137a and a second protrusion 137b are respectively formed from free ends of the first and second resilient tabs 132a, 132b. A first stop 138a and a second stop 138b extend respectively beside the first and second resilient tab 132a and 132b.

Figure 2:
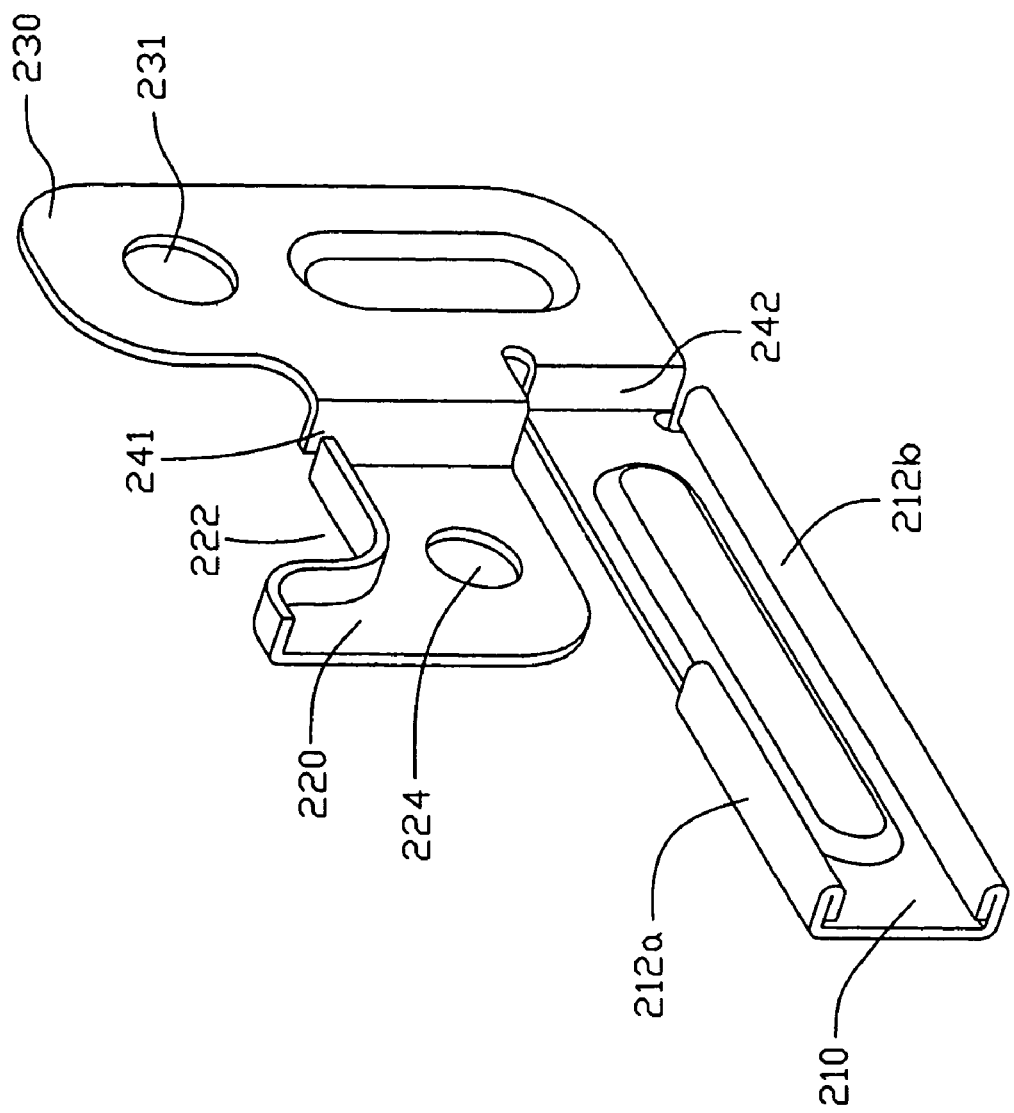
FIG. 2 is an enlarged view of the operating member of FIG. 1.
Figure 5:
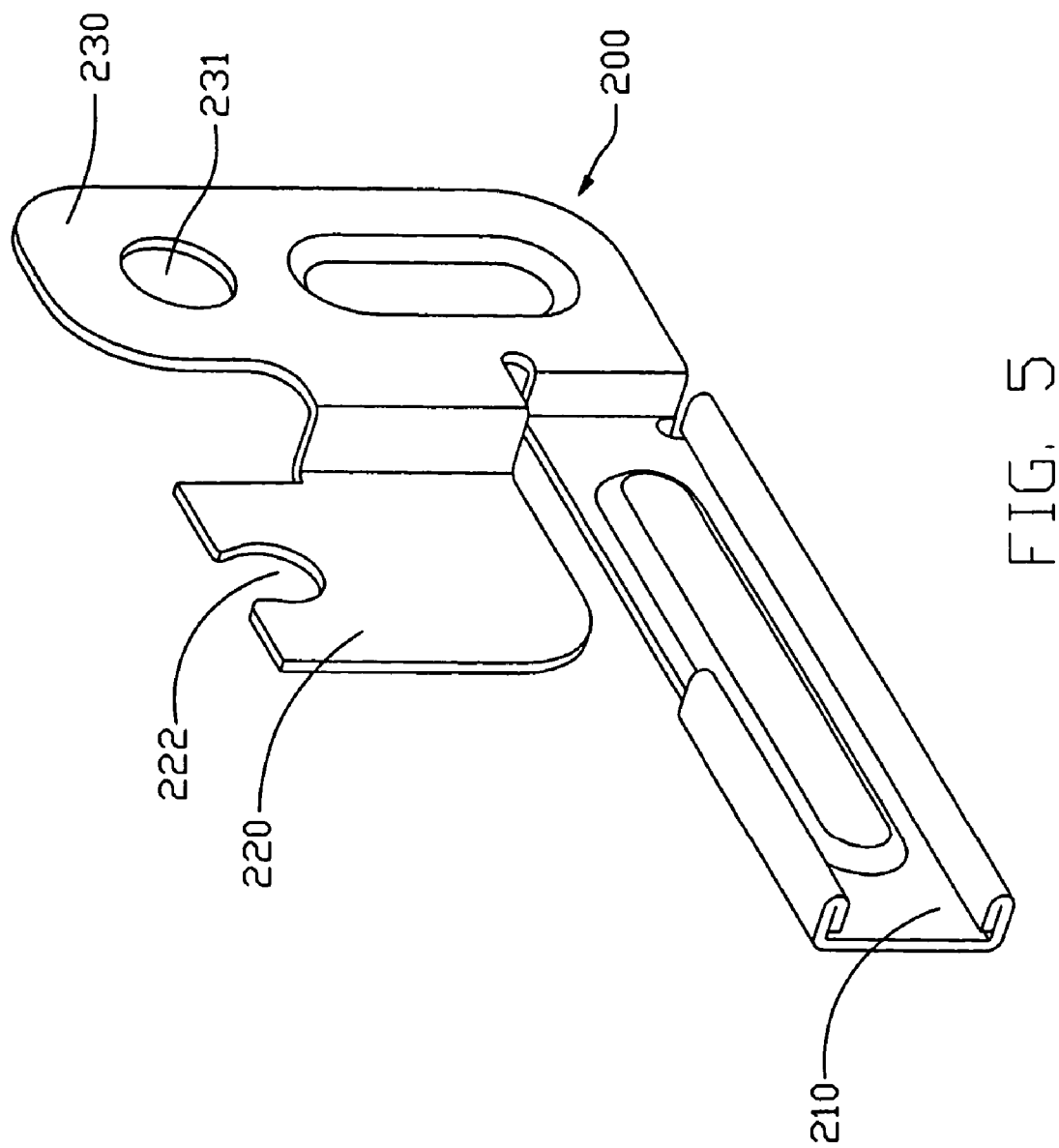
FIG. 5 is a second preferred embodiment of the operating member of the present invention.

Also referring to FIG. 2, the operating member 200 comprises a handing lever 210, a pivoting portion 230, and a locking portion 220. A second through hole 231 is defined in an upper portion of the pivoting portion 230, corresponding to the first through hole 135 of the bracket 100 for pivotally receiving a rivet 300 therein. A first connecting plate 241 and a second connecting plate 242 extend inwardly and perpendicularly from an inner edge of the pivoting portion 230, with the second connecting plate 242 below the first connecting plate 241. The handing lever 210 extends perpendicularly from outer edges of the second connecting plate 242, which parallels to the pivoting portion 230. The locking portion 220 extends perpendicularly from outer edges of the first connecting plate 241, which parallels to the pivoting portion 230 and the locking portion 220. A cutout 222 is defined in an upper portion of the locking portion 220, and a fixing hole 224 is defined in a middle portion of the locking portion 220. The cutout 222 defined in the pivoting portion 230 has a C-shaped profile (FIG. 2) or a U-shaped profile (Referring to FIG. 5). The fixing hole 224 is configured to receive the protrusion 137a or 137b of the bracket 100. A pair of folded brims 212a, 212b is formed perpendicularly and outwardly from an upper and a lower edges of the handing lever 210, corresponding to the stops 138a, 138b of the bracket 100.

Figure 3:
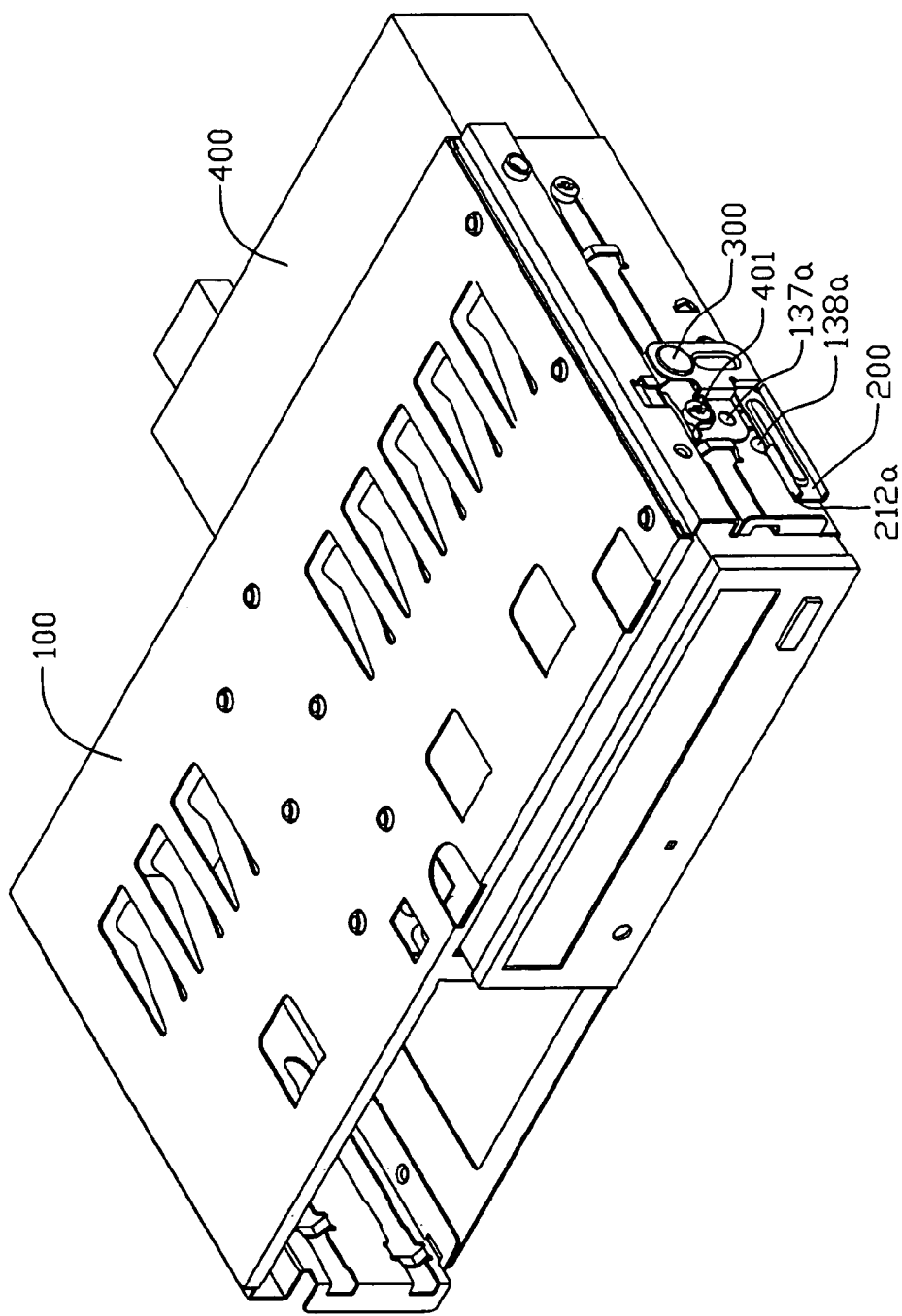
FIG. 3 is an assembled view of FIG. 1, showing data storage device in a locked state.

Referring to FIGS. 3–4, in assembly, the second through hole 231 of the operating member 200 aligns with the first through hole 135 of the bracket 100. The rivet 300 is extended through the second through hole 231 and engages in the first through hole 231 to pivotally attach the operating member 400 to the first sidewall 130 of the bracket 100. The data storage device 400 is moved into the bracket 100, with the screws 401 sliding along the grooves 131. When the data storage device 400 reaches its predetermined position in the bracket 100, the operating member 200 is pushed to rotate toward the groove 131 of the bracket. In this locked state, the handing lever 210 parallels the groove 131, and the data storage device 400 is securely mounted in the bracket 100, with front thumb screws 401 of the data storage device 400 securely located in the cutout 222 of the pivoting portion 220. The first protrusion 137a of the bracket 100 is received in the fixing hole 224 of the pivoting portion 220. The stop 138a abuts against the upper folded brim 212a of handing lever 210 to limit further moving of the operating member 200.

In disassembly, the operating member 200 is pushed to rotate away from the groove 131. The cutout 222 and the fixing hole 224 of the locking portion 220 disengage from the front screw 401 of the data storage device 400 and the protrusion 137a of the bracket 100, respectively. In the unlocked state, the handing lever 210 is perpendicular to the groove 131, with the lower brim 212b of the handing lever 210 abutting against the stop 138b and the fixing hole 224 of the locking portion 220 receiving the protrusion 137b of the bracket 100.

While the present invention has been illustrated by the description of preferred embodiment thereof, and while the preferred embodiment has been described in considerable details, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

What is claimed is:

1. A data storage device mounting assembly for accommodating a data storage device, a pair of protrusions being arranged at opposite sides of the data storage device, the mounting assembly comprising:
   a bracket comprising a bottom wall, a first sidewall and a second sidewall, a groove defined in each of the first and second sidewalls for receiving the protrusions of the data storage device, a first protrusion extending from the first sidewall;
   an operating member pivotally attached to the first sidewall, the operating member comprising a locking portion, a cutout, and a fixing hole defined in the locking portion; and
   wherein the data storage device is slidably moved into the bracket, the operating member is rotated so that the fixing hole and the cutout respectively engage with one of the protrusions of the data storage device and the first protrusion of the bracket, thereby the data storage device is secured in the bracket.

2. The data storage device mounting assembly as claimed in claim 1, wherein the bracket further comprises a top wall, a plurality of resilient strips extends from the top wall and applies a downward force on the data storage device.

3. The data storage device mounting assembly as claimed in claim 1, wherein at least one stop extends from the first sidewall of the bracket and engages with the operating lever to locate the operating member.

4. The data storage device mounting assembly as claimed in claim 1, wherein a protruding member extends over the groove of the first sidewall of the bracket, a through hole is defined in the protruding member.

5. The data storage device mounting assembly as claimed in claim 4, wherein the operating member further comprises a handing lever and a pivoting portion, a through hole is defined in the pivoting portion, corresponding to the through hole of the bracket to pivotally receiving a rivet therein.

6. The data storage device mounting assembly as claimed in claim 1, wherein the first sidewall of the bracket further comprises a first resilient tab near the groove, the first protrusion is formed from the first resilient tab.

7. The data storage device mounting assembly as claimed in claim 6, wherein the first sidewall further comprises a second resilient tab away from the groove, a second protrusion is formed from the second resilient tab for engaging with fixing hole of the operating member so as to locate the operating member in an unlocked state.

8. A data storage device mounting assembly comprising:
   a data storage device with a plurality of screw on sidewall thereof;
   a bracket slidably receiving the data storage device, the bracket comprising a first sidewall and a second sidewall, a groove is defined in each of the sidewalls;
   an operating member pivotally attached to the first sidewall of the bracket, the operating member comprising a locking portion with a locking means; and
   wherein the data storage device is inserted in the bracket, the operating member is rotated to lock the data storage device in the bracket with the locking means engaging correspondingly with the first sidewall and the screws of the data storage device.

9. The data storage device mounting assembly as claimed in the claim 8, wherein the locking means comprises a cutout defined in the locking portion, the cutout engagingly receives the screws of the data storage device.

10. The data storage device mounting assembly as claimed in the claim 9, wherein the locking means further comprises a fixing hole defined in the locking portion, at least one protrusion is formed from the first sidewall of the bracket and received in the fixing hole.

11. The data storage device mounting assembly as claimed in the claim 8, wherein the cutout is generally U-shaped.

12. The data storage device mounting assembly as claimed in the claim 8, wherein the cutout is generally C-shaped.

13. The data storage device mounting assembly as claimed in the claim 8, wherein the bracket further comprises a top wall, a plurality of resilient strips extends from the top wall and applies a downward force on the data storage device.

14. The data storage device mounting assembly as claimed in the claim 8, wherein a protruding member defining a first through extends cross the groove of the first sidewall of the bracket, the operating member further comprises a pivoting portion defining a second through hole, a rivet is extended through the first and second though holes to attach the operating member to the bracket.

15. A mounting assembly for accommodating a data storage device, a protrusion being arranged at one side of the data storage device, the mounting assembly comprising:

a bracket having one sidewall defining a groove for receiving the protrusion of the data storage device, wherein a knob is formed at the sidewall near the groove;

an operating member pivotally attached to the sidewall, the operating member comprising a cutout, and a fixing hole;

wherein the operating member is pivotable between a first position in which the cutout engages with the protrusion of the data storage device and the fixing hole engages with the knob of the bracket, and a second position in which the cutout disengages from the protrusion of the data storage device.

16. The mounting assembly as claimed in claim 15, wherein a protruding member extends across the groove, and defines a pivot hole therein.

17. The mounting assembly as claimed in claim 15, wherein the operating member further comprising a handling portion for manual operation.

18. The mounting assembly as claimed in claim 15, wherein a stop is formed at the sidewall near the knob, for locating the handling portion.

19. The mounting assembly as claimed in claim 15, wherein a cantilevered resilient tab is formed at the sidewall, the knob is formed at a free end of the resilient tab.

* * * * *